Figures 5, 6:
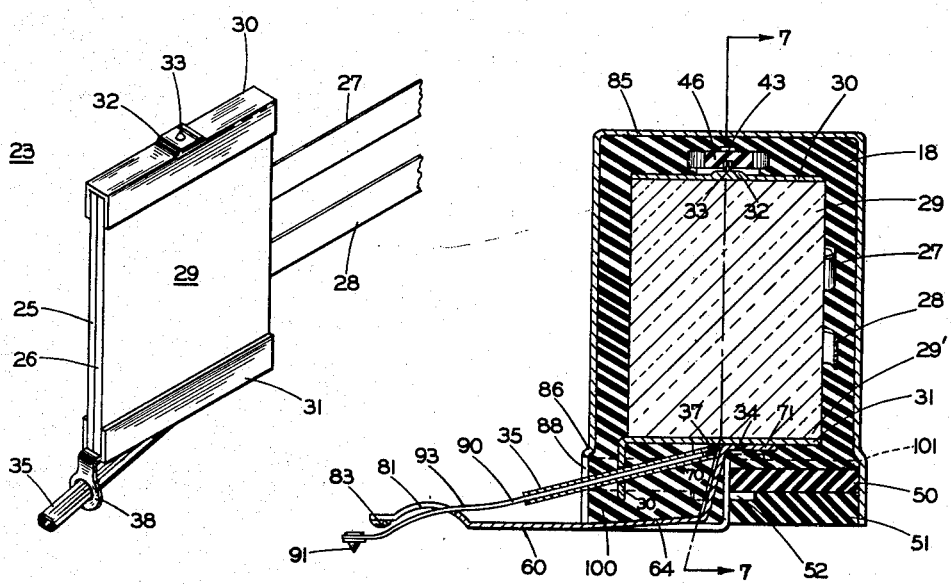

Aug. 15, 1950   F. S. HARRIS   2,519,185
PHONOGRAPH PICKUP
Filed Oct. 30, 1947   2 Sheets-Sheet 1
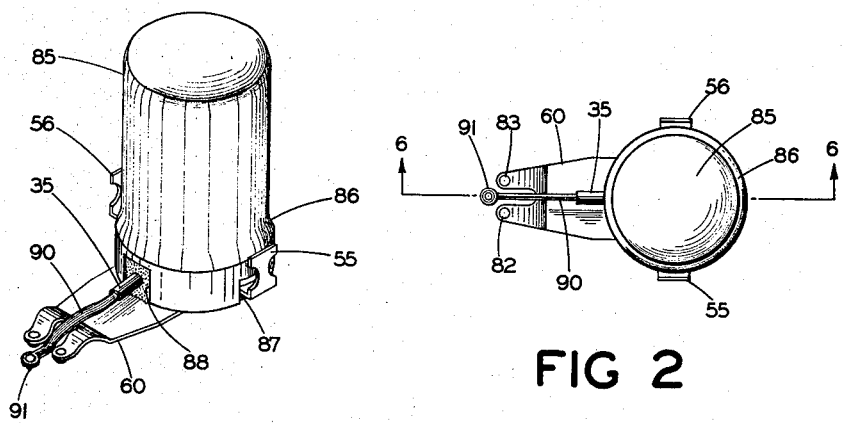
FIG. 1
FIG 2
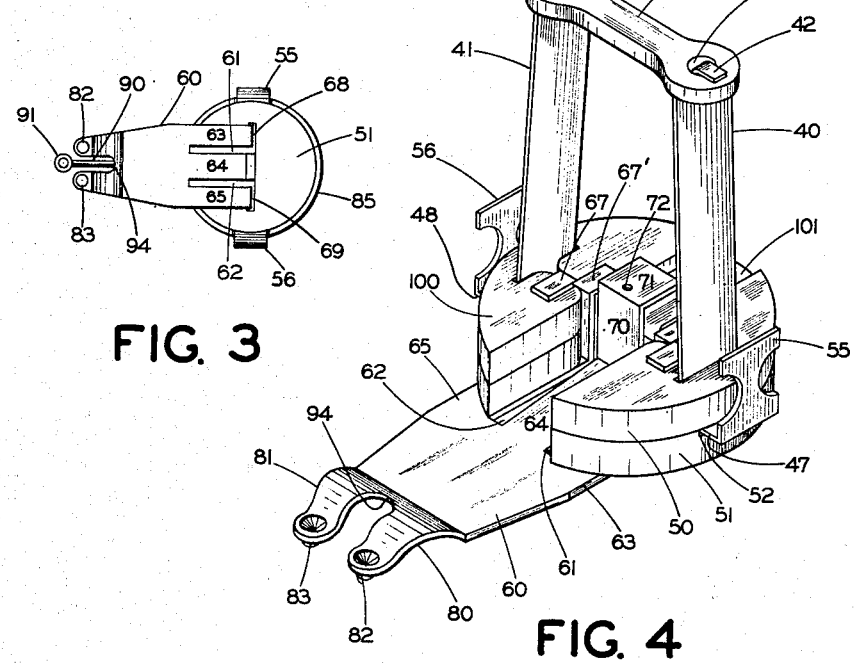
FIG. 3
FIG. 4
INVENTOR.
FRANCIS S. HARRIS
BY
Eber J. Hyde
ATTORNEY Aug. 15, 1950  F. S. HARRIS  2,519,185
PHONOGRAPH PICKUP
Filed Oct. 30, 1947  2 Sheets-Sheet 2

*INVENTOR.*
FRANCIS S. HARRIS
BY
*Eber J. Hyde*
ATTORNEY

Patented Aug. 15, 1950

2,519,185

UNITED STATES PATENT OFFICE 2,519,185

PHONOGRAPH PICKUP

Francis S. Harris, Lakewood, Ohio, assignor to Brush Development Company, Cleveland, Ohio, a corporation of Ohio Application October 30, 1947, Serial No. 783,113
In Great Britain March 21, 1947

11 Claims. (Cl. 179—100.41)

This invention pertains to a new and novel transducer element, and more particularly to a new and novel phonograph pickup device.

In the prior art, transducer elements such as piezoelectric crystal elements for phonograph pickups have been enclosed in semi-solid embedment materials such as petroleum jelly (Vaseline), lanolin and the like in order to moisture-proof the crystal and in order to damp resonant vibrations of the transducer system. These crystal elements were contained in a housing and the housing was substantially filled with the semi-solid material. Due to the characteristics of the semi-solid materials which had no stiffness and exerted only a mechanical resistance force against the crystal element throughout its range of vibration it could not act as a mounting means and it was necessary to hold the crystal element within the housing by the usual mounting pads which are well known in the art.

Application for United States Letters Patent Serial No. 783,148 filed concurrently herewith in the name of Thomas E. Lynch and assigned to the same assignee as the present invention, describes and claims an electromechanical transducer unit for use over a given range of frequencies comprising a transducer element and mounting means in engagement with the transducer element. The mounting means exert predominantly a stiffness force against the transducer element as the element vibrates at the lower frequencies within the range and exert predominantly a mechanical resistance force against the transducer element as the element vibrates at the higher frequencies within the range. The mounting means, in its preferred form, comprises a mass of semi-solid material which has stiffness, and this semi-solid mass because it has stiffness compries the sole means for supporting the transducer element against the operating forces which are applied to it. The present application pertains to means for preventing cold-flow of the mass of semi-solid material from dislodging a phonograph pickup stylus. Application for United States Letters Patent Serial No. 783,114 filed concurrently herewith in the name of Joel A. Burtch and assigned to the same assignee as the present invention, describes and claims the details of a harness for holding a transducer element such as a piezoelectric crystal unit in the semi-solid material. The present application also pertains to means for preventing the establishment of high shear forces in the semi-solid material between the harness and the vibrating piezoelectric crystal unit.

An object of the present invention is to prevent cold-flow of a semi-solid mounting material from dislodging the stylus of a phonograph pickup.

Another object of the present invention is to prevent high shear forces from being established in semi-solid mounting material for a piezoelectric crystal element.

For a better understanding of the present invention, together with other and further objects thereof, reference is had to the following description taken in connection with the accompanying drawings, and its scope will be pointed out in the appended claims.

In accordance with this invention there is provided a phonograph pickup comprising an electromechanical transducer and a housing for the transducer. Within the housing and in engagement with the transducer there is a mass of semi-solid material. One end of a flexible drive arm is connected to the transducer at a location within the housing and the other end of the arm is connected to a stylus at a location outside of the housing. A holder means is connected to the housing and is positioned adjacent the drive arm, and it engages and holds the drive arm at all times when the stylus is not in contact with a record. This prevents the drive arm and the stylus from being dislodged from their normal position by cold-flow of the semi-solid material. When the stylus is in engagement with a record, the drive arm is flexed to a position out of contact with the holder means where it is free to vibrate under forces derived from the phonograph record.

In accordance with another aspect of the invention there is provided a phonograph pickup comprising a flexing-type piezoelectric crystal element and harness means for holding the crystal element within a housing. The harness means includes bearing means in engagement with portions of the crystal element, and there is semi-solid material within and substantially filling the housing. The semi-solid material is in engagement with the crystal element and with the harness means. The harness means, with the exception of the bearing means, and the housing are spaced away from the crystal element, and the space therebetween is substantially filled with the semi-solid material. As the crystal element vibrates this material is subject to shear forces but the spacing is such that the shear forces generated are sufficiently low as to permit vibration of the crystal element.

Figures 7, 8:
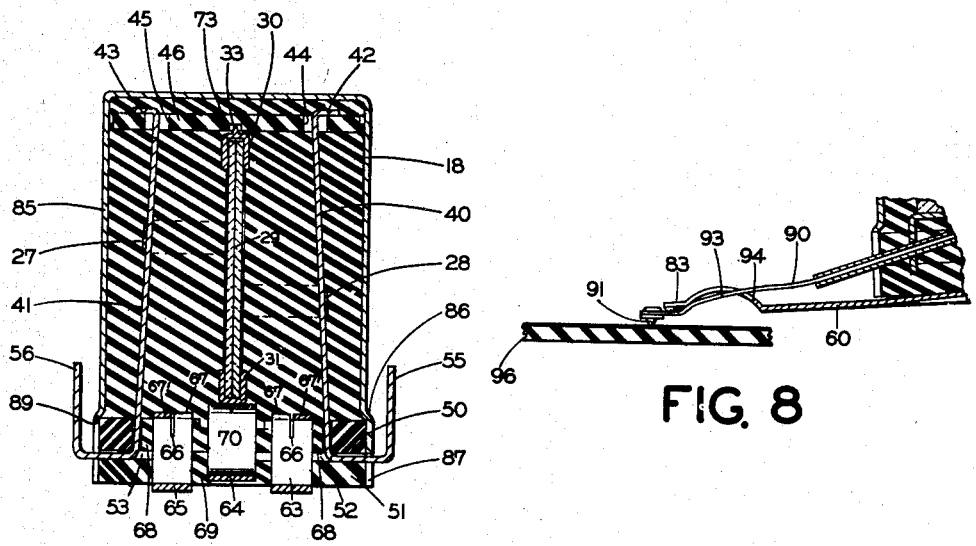

Fig. 1 is an isometric view of an assembled pickup; Fig. 2 is a top view of the pickup; Fig. 3 is a bottom view of the pickup; Fig. 4 is an isometric view, on a larger scale, of a portion of the pickup; Fig. 5 is an isometric view of the crystal assembly used in the pickup; Fig. 6 is a cross-sectional view taken along line 6—6 of Fig. 2; Fig. 7 is a cross-sectional view taken along line 7—7 of Fig. 6; and Fig. 8 is a sectional side view showing the details of a portion of the device.

In Figures 1, 2 and 3 there is shown a phonograph pickup comprising a cup-shaped housing portion 85 having a larger diameter at its lip so that a shoulder 86 is formed. Against this shoulder there is positioned a base 51 formed of several washers connected together by portions of the back end of a stylus guard 60. The base 51 substantially closes the end of the cup-shaped housing 85. A harness, shown in detail in Fig. 4, is connected to the base 51 and a piezoelectric crystal element 29 is mounted in the harness for free rotary motion but is restrained from any lateral displacement. A quill 35 is connected to the lower edge of the crystal element and extends to the outside of the housing 85. A long thin vertically flexible stylus arm carrying a stylus tip 91 is connected into the quill 35.

As the stylus tip 91 is moved laterally by a phonograph record the crystal element 29 is rotated in its harness.

Within the housing 85 there is a semi-solid mass of rubber-like material 18 contacting a broad area of the crystal and exerting a stiffness force against the crystal 29 as the crystal is twisted by a phonograph record groove laterally moving the tip of the stylus 91. Because the material 18 is compliant and yieldingly tends to hold the crystal in place, a force applied to the chuck end of the crystal 29 stresses the crystal and causes the crystal to generate an electromotive force representative of the mechanical force applied to the crystal. Contrary to the prior art, no mounting pads or other means for forcibly restraining localized portions of the crystal element 29 are utilized.

The material 18 when properly chosen in accordance with specifications presented later, acts as a stiffness-controlled mounting for the piezoelectric crystal element 29 at frequencies below a certain frequency which varies in accordance with its composition. With the crystal element vibrating at frequencies up to this certain frequency, a force potential independent of frequency is produced across the length of the crystal element causing the element to generate a voltage which is also independent of frequency. At frequencies above this certain frequency the material 18, because of its molecular friction, begins to act as a mechanical resistance to the motion of the crystal element so that the crystal element now has produced across its length a force potential proportional to the frequency of its vibration. This generates for a given amplitude of stylus displacement a voltage output rising at a rate of about 6 db./octave starting at the certain frequency. If the mounting material 18 has somewhat more internal friction the pickup response can be made to start rising at a lower frequency, and if it has somewhat less internal friction the pickup response can be made to start rising at a higher frequency. The point at which the pickup response starts to rise may, by analogy to the terms used in the phonograph art, be called the "turn-over" point. Below the "turn-over" point the force exerted against the crystal element by the material 18 is predominantly a stiffness force although there may also be exerted a mechanical resistance force. Above the "turn-over" point the force is predominantly a mechanical resistance force although there may also be a stiffness force exerted.

Commercial phonograph records are usually cut constant amplitude up to about 400 cycles per second and constant velocity above that frequency. If such a record is reproduced by a phonograph pickup having no equalization an output response flat to about 400 cycles per second (the "turn-over" point) is obtained, and the response thereafter falls at a rate of about 6 db./octave. A graph of the output voltage from a phonograph pickup embodying the present invention as the pickup reproduces a commercial phonograph record is flat to about 400 cycles and falls at a rate of about 6 db./octave between 400 and 700 cycles. At this frequency the output becomes flat and stays flat to well out beyond 7,000 cycles. This provides, without any electrical equalization, a base boost which for many applications is desirable.

The material 18 within the housing 85 very effectively seals the transducer element 29 against moisture. If further provides a very effective shock mount thereby, if it is so desired, permitting the use of very thin, fragile, multiplate crystal elements. In addition to providing an excellent mounting and in addition to providing internal equalization the material 18 also damps resonances which may occur in the crystal or in the crystal system comprising the crystal element 29 and the chuck or quill 35.

Satisfactory results from a phonograph pickup of the type shown in Fig. 1 are obtained if the material 18 is of the plasticized polyvinyl resin type. One such material is sold under the trade name Korogel. Rubber-like plastic elastomers of the vinylite type are also satisfactory. One such elastomer is made by copolymerizing polyvinyl chloride and polyvinyl acetate and dispersing the resultant resin in a plasticizer such as dibutyl or dioctal phthalate or a mixture of the two.

Many of the materials which are suitable for mounting piezoelectric crystal elements in accordance with this invention will cold-flow with time thereby slightly dislodging the crystal element. In order to reduce the effects of cold-flow and in order to assemble the pickup with the crystal element and its attached stylus assembly accurately in position a harness, illustrated in Fig. 4, is provided.

The crystal element assembly, indicated generally by the reference character 23, is shown in detail in Fig. 5. It comprises two plates of piezoelectric crystalline material 25 and 26 connected together and to the leads 27 and 28 to form a multiplate flexing element identified generally by the reference character 29. The crystal element 29 is provided at its top with a saddle element 30 of inverted channel form which is straddled across the thickness of the element. At its bottom end the crystal is provided with a cradle element 31, also of channel form, within which the lower end of the crystal is firmly held. The center portion 32 of the saddle 30 is raised slightly above the main portion thereof and a pivot 33 extends slightly above the raised portion 32. The bottom channel 31 carries a pivot point 34. From the underneath side of the crystal 31 there extends a downwardly inclined laterally projecting hollow quill 35, the inner end of which is secured to the cradle 31 by sweating or other suitable means, and the cradle carries a projection 37 (Fig. 6) which fits into the end of the hollow quill in order to accurately position the quill. The cradle 31 includes an integrally connected locating member 38 which extends downwardly from one of its ends. The member 38 has a hole in it through which the quill 35 extends, and a drop of solder may be applied to the quill at the location where it extends through the member 38 in order to firmly connect the two together. Thus the quill 35 is firmly connected to and accurately aligned with respect to the crystal element 29.

The sub-assembly comprising the crystal element 29 with its connected quill 35 is mounted in a frame, or harness, which is shown in Fig. 4. The crystal element within the harness is free to rotate but is restrained against movement both lengthwise and laterally to prevent cold-flow of the semi-solid material from dislodging the crystal element and moving the stylus out of its position. The mounting frame comprises two upstanding side portions 40, 41 in the form of flat metal strips having their upper ends 42, 43 inserted through holes 44, 45 in a flat top plate 46 which is made of insulation material. The ends 42, 43 of the metal strips are turned over to connect the top plate 46 to the side legs 40, 41. The base of the harness comprises a pair of superimposed flat circular disks 50, 51 also made of electrical insulation material. The lower ends 47, 48 of the side legs 40, 41 extend downwardly through slots in the upper base disk 50 and then turn and extend outwardly in opposite directions within shallow channels 52, 53 provided in one or both of the opposing faces of the superimposed base disks 50, 51. The lower extremities of the side legs 40, 41 after passing outwardly from between the base disks 50, 51 are turned upwardly to lie substantially parallel to the legs 40, 41 and these up-turned extremities 55, 56 constitute conducting tongues through which electrical connection may be made to the leads 27, 28 of the crystal element 29 when the crystal element is mounted within the harness. The two super-imposed base disks 50, 51 are connected together by means of a portion of a flat stylus guard member 60 which is formed from a spring material. The end of the stylus guard 60 which lies underneath the base 50, 51 is slotted at 61, 62 to provide three tongues 63, 64, and 65. As may be seen in Fig. 7 the end of each of the tongues 63, 65 is slotted for a short distance at 66 to form two tabs 67, 67' at the end of each of the tongues 63, 65. Tongues 63, 65 extend upwardly through registering slots 68, 69 in the base disks 50, 51 and the two tab portions 67, 67' of each of the tongues are folded over in opposite directions against the upper face of the disk 50 to clamp the two disk portions 50, 51 together thereby firmly holding legs 40, 41 in place. The central tongue portion 64 of the stylus guard 60 is bent upwardly to form an upstanding portion 70 and is then again bent to form a horizontal portion 71. The horizontal portion 71 has a small detent 72 in it and the top plate 46 has a small detent 73 (shown in Fig. 7) located near its center. The crystal assembly shown in Fig. 5 fits into the harness shown in Fig. 4 with the saddle 30 extending substantially perpendicular to the direction of the top plate 46 of the harness. The pivot point 33 fits into the detent 73, and the pivot point 34 fits into the detent 72. Due to the springiness of the stylus guard 60, the tongue portion 64 biases the crystal assembly upwardly against the top plate 46 thereby resiliently holding the crystal sub-assembly in place. It is preferable to resiliently hold the crystal assembly in place by means of a spring urging the crystal assembly upwards against a stiff top member rather than by a spring urging the crystal assembly downwardly against a stiff base as a sudden blow on the stylus arm, such as by dropping the pickup arm onto the stylus will not dislodge the pivot points from the pivots when the former construction is used. The crystal lead 27 is wound around the metal leg 41 and soldered to it, and crystal lead 28 is wound around and soldered to the metal leg 40, as shown in Fig. 7. The quill 35 of the crystal sub-assembly extends in a direction toward the outer end of the stylus guard 60 which is bifurcated to establish two leg portions 80 and 81 with a notch 94 therebetween. Each of the legs at its outer end is dimpled to establish on its lower face a smooth bearing surface 82, 83 and, as is shown best in Fig. 6, each leg is arched upwardly from the main portion of the stylus guard 60.

A cannister, or housing, 85 which is deeply cup-shaped is provided. This cannister 85 is filled with semi-solid crystal-supporting material 18 and the crystal sub-assembly comprising the crystal assembly 23 mounted in its harness is positioned in the cannister 85 with the upper disk 50 of the base engaging a narrowed shoulder 86 of the cannister and closing the open end of the cannister.

The cannister 85 is adapted to be connected to a phonograph pickup arm, so in order to assure true alignment of the stylus arm with respect to the pickup arm the stylus arm must be accurately aligned with respect to the cannister. The crystal assembly, including the quill 35, is mounted in the frame and a stylus assembly 90 is connected into the quill 35. The deeply cup-shaped cannister 85 is filled with liquid material which, when processed, becomes semi-solid. While the material 18 is in a liquid state the crystal assembly, in its frame, is pushed into the filled cannister until the upper disk 50 of the base engages a narrowed shoulder 86 of the cannister. This accurately places the frame with respect to the cannister 85. The stylus assembly 90 is firmly held in the notch 94 in the stylus guard thus orienting the crystal 29 with respect to the frame and the stylus with respect to the cannister while the material 18 solidifies. The cannister 85 is notched at three places 87, 88 and 89 around its lip, and the extremity 55 of the metal leg 40 extends outwardly from the cannister 85 through slot 87. When the crystal assembly is in place in the cannister 85 the top surface of the leg extremity 55 engages the cannister 85, thereby making an electrical contact. This is the ground side of the electrical circuit to the piezoelectric crystal 29 and the cannister 85 thereby becomes a grounded electrical shield. The leg extremity 56 extends outwardly from the cannister 85 through the slot 89, but is spaced from the cannister to prevent electrical contact and the quill 35 extends outwardly from the cannister 85 through the slot 88.

The stylus assembly is easily replaceable. It comprises a long, thin strip of metal 90 into one end of which is connected a jewel stylus tip 91. The end of the stylus arm 90 opposite the stylus tip 91 is bent slightly as at 92 so that as the stylus arm is pushed into the hollow quill 35 the bend in the arm is flattened to cause it to firmly engage the walls of the quill. This holds the stylus arm into the quill by friction alone, obviating the use of thumb screws and the like and greatly reducing the mass of the stylus assembly. By so mounting the stylus arm in the quill 35 it may easily be replaced. A pull on the stylus arm in a direction substantially parallel to the direction of extension of the quill 35 easily removes the stylus arm from the quill and to replace it with a new one, the new stylus arm is merely pushed back into the quill. The stylus arm 90 is arched slightly at 93, and when the stylus arm is in place in the quill 35 with the stylus tip 91 lying between the legs 80, 81 of the stylus guard 60, the stylus tip 91 projects just slightly below the bearings 82, 83. As is shown in Fig. 6 the arched portion of the stylus arm 90 is located substantially at the point where the stylus arm extends between the legs 80, 81 of the stylus guard 60. When the pickup is not in engagement with the record the stylus arm 90 rests in the notch 94 between the legs 80, 81 thereby holding the stylus arm and preventing cold-flow of material 18 over a period of time from dislodging the stylus. When the pickup is being used to transcribe a record, the operator lowers the pickup arm supporting the cannister 85 until the stylus tip 91 engages the record 96 and supports the unbalanced weight of the pickup arm. This unbalance weight lifts the stylus arm 90 slightly with respect to the stylus guard 60, thereby releasing the stylus arm 90 from the notch 94 so that the arm can move laterally a limited distance under the influence of the grooves in the phonograph record 96, as is shown in Fig. 8. When the pickup is lifted from the record the stylus arm 90 once more is located by the notch 94. If the stylus arm is carelessly dropped onto the record, the stylus arm 90 bends readily until the smooth bearings 82, 83 at the extremity of the stylus guard 60 hit the record 96. The spring guard 60 is much stiffer than the spring pickup arm and it easily absorbs the force of dropping the pickup arm without damage to itself and, due to the large area of the bearings 82, 83 compared to the small area in the tip of a phonograph stylus, the record is not damaged by the guard. The greater vertical flexibility of the stylus arm allows the stylus 91 to retract under the force of the fall thus preventing damage to the record by the stylus tip.

This stylus construction eliminates the usual stylus chuck with its clamping screws. It eliminates soldering operations during the replacing of the stylus and, most important of all, it greatly reduces the stylus assembly weight and consequently the dynamic inertia forces involved when a record is reproduced. The stylus arm assembly weighs approximately .0015 ounce.

In order that the crystal element 29 shall move freely under the influence of driving forces from the stylus system it is important that shear forces in the mounting material 18 be kept to a minimum. These shear forces exist in the semi-solid material between the crystal saddle 30 and the top cross-bar 46 of the frame and between the crystal cradle 31 and the top surface of the base disk 50. In order to reduce the shear force at the top of the crystal element to prevent "locking" of the top edge of the movable crystal element to the stationary frame, the saddle 30 is provided with a step 32 between the pivot 33 and the top surface of the saddle. This step 32 spaces the main portion of the saddle sufficiently far away from the crossbar 46 of the frame that an appreciable depth of the semi-solid material will exist between the saddle and the crossbar. Because of the appreciable depth of the semi-solid material the shear forces produced therein by motion of the crystal element with respect to the harness is kept to a minimum value which does not disturb the operation of the device. The lower edge of the crystal element 29 moves with greater amplitude than the upper edge so it is of even greater importance that high shear forces be prevented in the material 18 which lies between the lower edge of the crystal element 29 and the top face of the base disk 50. This is achieved by providing registering slots 100 in the base disks 50, 51 to accommodate the quill 35 which extends downwardly and outwardly from the center portion of the lower edge of the crystal element 29. The semi-solid material 18 covers the lower edge of the crystal element 29, as is shown in Fig. 6, and fills the quill slot 100 thereby damping the vibrations of the quill, and because of the relatively large amount of semi-solid material 18 keeping the shear forces low. In the top surface of the base disk 50 immediately below the back corner 29' of the crystal element 29 there is provided a groove 101 which is filled with semi-solid material 18. The depth of the material 18 between the cradle 31 and the bottom of the groove 101 is sufficient to prevent high shear forces in the material 18.

From Fig. 6 it will be noted that the lower pivot point 34 is not on the vertical center line of the crystal element 29 but is set back a short distance toward the back corner 29' of the crystal element. If the crystal element were suspended in the semi-solid mounting material 18 without a harness low frequency vibrations would cause it to vibrate about a line running from somewhere in the vicinity of the lower back corner 29' of the crystal plate up toward the central portion of the top edge of the crystal plate. As the crystal element vibrated at higher frequencies the lower pivot point would move in toward the vertical center line of the crystal element.

While there have been described what are at present considered to be the preferred embodiments of this invention, it will be obvious to those skilled in the art that various changes and modifications may be made therein without departing from the invention, and it is therefore, aimed in the appended claims to cover all such changes and modifications as fall within the true spirit and scope of the invention.

What is claimed is:

1. A phonograph pickup comprising, a flexing type electromechanical transducer, a housing for said transducer, a mass of semi-solid material within said housing in engagement with and surrounding said transducer and comprising the only resistance to the flexing of said transducer, a stylus, a flexible drive arm one end of which is connected to said transducer within said housing and the other end of which is connected to said stylus outside of said housing, and holder means connected to said housing and positioned adjacent said drive arm, said holder means engaging and holding said drive arm at all times when said stylus is not in contact with a record to prevent said drive arm and said stylus from being dislodged from their normal position by cold-flow of said semi-solid material, said drive arm when said stylus is in engagement with a record being flexed to a position out of contact with said holder means.

2. A phonograph pickup as set forth in claim 1 further characterized by said holder means including a foot positioned adjacent said stylus and comprising a stylus guard to engage a record and prevent damage to said stylus if said pickup is dropped onto a record.

3. A phonograph pickup comprising, a flexing-type piezoelectric crystal element adapted to generate an electric signal upon being flexed, a housing for said crystal element, semi-solid material within said housing in engagement with and surrounding said crystal element and comprising the only resistance to the flexing of said transducer, a stylus, a vertically flexible crystal element drive arm one end of which is connected to said crystal element within said housing and the other end of which is connected to said stylus outside said housing, and a vertically flexible stylus guard a portion of which is connected to said housing and a portion of which is positioned adjacent said stylus, the tip of said stylus normally occupying a position below said stylus guard, the vertical stiffness of said drive arm being less than the vertical stiffness of said stylus guard.

4. A phonograph pickup as set forth in claim 3, further characterized by said drive arm engaging said stylus guard when said stylus is free from contact with a record, said stylus guard firmly holding said drive arm whereby the said stylus and the said drive arm are not dislodged by cold-flow of said semi-solid material.

5. A phonograph pickup as set forth in claim 3, further characterized by said stylus guard having a notch in its said portion which is positioned adjacent the stylus, said drive arm extending from said crystal element through said notch to said stylus, the side walls of said stylus guard defining said notch engaging and holding said drive arm at all times except when the unbalanced weight of the pickup is resting on said stylus.

6. A phonograph pickup cartridge for use with a phonograph pickup arm to reproduce a record, comprising, a housing, a flexing type transducer within said housing, semi-solid material within said housing and supporting said transducer, said semi-solid material being subject to cold-flow and comprising substantially the only resistance to the flexing of said transducer, stylus means connected to said transducer and extending to the exterior of said housing and adapted to rest against said record and support the unbalanced weight of said pickup arm during reproduction of said record, and holding means connected to said housing and in holding engagement with said stylus means only when said stylus means is not in engagement with said record thereby to lock said stylus means against displacement due to cold-flow of said semi-solid material, the unbalanced weight of said pickup arm on said stylus means during reproduction of a record being sufficient to bias said stylus means out of engagement with said holding means.

7. A phonograph pickup cartridge as set forth in claim 6, further characterized by said holding means comprising a generally horizontally extending member one end of which is connected to said housing and the other end of which is notched and is located away from said housing, and characterized by the back end of said stylus means being connected to said transducer at a location above said one end of said holding means and by the stylus tip end of said stylus means being located below the notched end of said holding means, the stylus arm between the said back end and the said stylus tip extending through the said notch in said holding means.

8. A phonograph pickup cartridge as set forth in claim 7, further characterized by said stylus arm being flexible vertically, the degree of flexibility being such that when the stylus tip is in engagement with a phonograph record and supports the unbalanced weight of the said pickup arm the said stylus arm is flexed sufficiently that it is spaced away from said holding means throughout its entire length yet not so much as to cause the stylus tip to lie in the plane of the bottom surface of said holding means.

9. A phonograph pickup cartridge as set forth in claim 8, further characterized by said holding means being flexible vertically.

10. A phonograph pickup cartridge as set forth in claim 9, further characterized by said stylus arm being more flexible than said holding means.

11. A phonograph pickup comprising, a flexing type electromechanical transducer, a housing, semi-solid material within said housing surrounding and supporting said tranducer within said housing with substantially no force being exerted on said transducer, stylus means including a flexible arm extending through said housing and connected to said transducer, and a stylus guard connected to said housing and normally in engagement with said stylus means to restrain said stylus means and reduce dislodgment of said transducer due to cold-flow of said semi-solid material, said flexible arm bending when said stylus means is in operative engagement with a record to cause said arm to disengage from said stylus guard.

FRANCIS S. HARRIS.

REFERENCES CITED

The following references are of record in the file of this patent:

UNITED STATES PATENTS

| Number | Name | Date |
| --- | --- | --- |
| 2,106,051 | Dunning | Jan. 18, 1938 |
| 2,177,692 | DiToro | Oct. 31, 1939 |
| 2,280,763 | Hasbrouck | Apr. 21, 1942 |
| 2,313,129 | Dohan | Mar. 9, 1943 |
| 2,363,497 | Begun | Nov. 28, 1944 |